United States Patent [19]

Haahjem

[11] Patent Number: 4,616,969

[45] Date of Patent: Oct. 14, 1986

[54] EMPTYING DEVICE FOR BULK MATERIAL

[76] Inventor: Kaare Haahjem, Haahjem A/S, P.O. Box 25, N-6040 Vigra, Norway

[21] Appl. No.: 658,384

[22] Filed: Oct. 5, 1984

[30] Foreign Application Priority Data

Oct. 26, 1983 [NO] Norway ................... 833913

[51] Int. Cl.$^4$ ............................. B65G 65/38
[52] U.S. Cl. ................... 414/144; 198/511; 198/520; 414/145; 414/313
[58] Field of Search ............ 414/144, 146, 313; 198/511, 520

[56] References Cited

U.S. PATENT DOCUMENTS

| 1,428,240 | 9/1922 | Kemmerer | 198/520 |
| 2,735,591 | 2/1956 | Branchflower | 414/313 X |
| 4,170,433 | 10/1979 | Haahjem | 414/144 X |
| 4,474,523 | 10/1984 | Ihle | 414/145 X |

FOREIGN PATENT DOCUMENTS 2311900 9/1973 Fed. Rep. of Germany ...... 414/145

Primary Examiner—Leslie J. Paperner
Attorney, Agent, or Firm—Darby & Darby

[57] ABSTRACT

An emptying device for bulk material in cargo or storage rooms (2) comprises a first horizontal conveyor (3) which may be raised and lowered along one side of the room and move bulk material in the direction of a lifting conveyor (4). A further horizontal conveyor (5) moves the bulk material towards said first conveyor (3) and is movable along the latter. Said first conveyor (3) is provided with means (26) enabling it to dig room for itself in the bulk material as it is lowered. The other conveyor (5) comprises a belt conveyor (6) and a excavating wheel (7) rotating about the conveyor and being movable along the conveyor. Said first conveyor (3) has catchers (24) for transporting bulk material.

6 Claims, 8 Drawing Figures

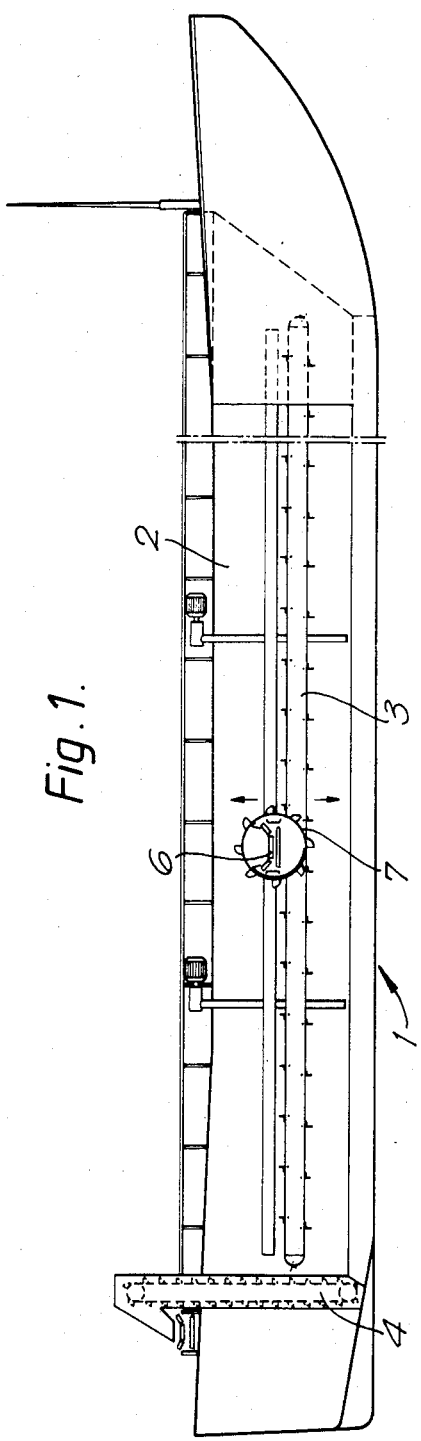
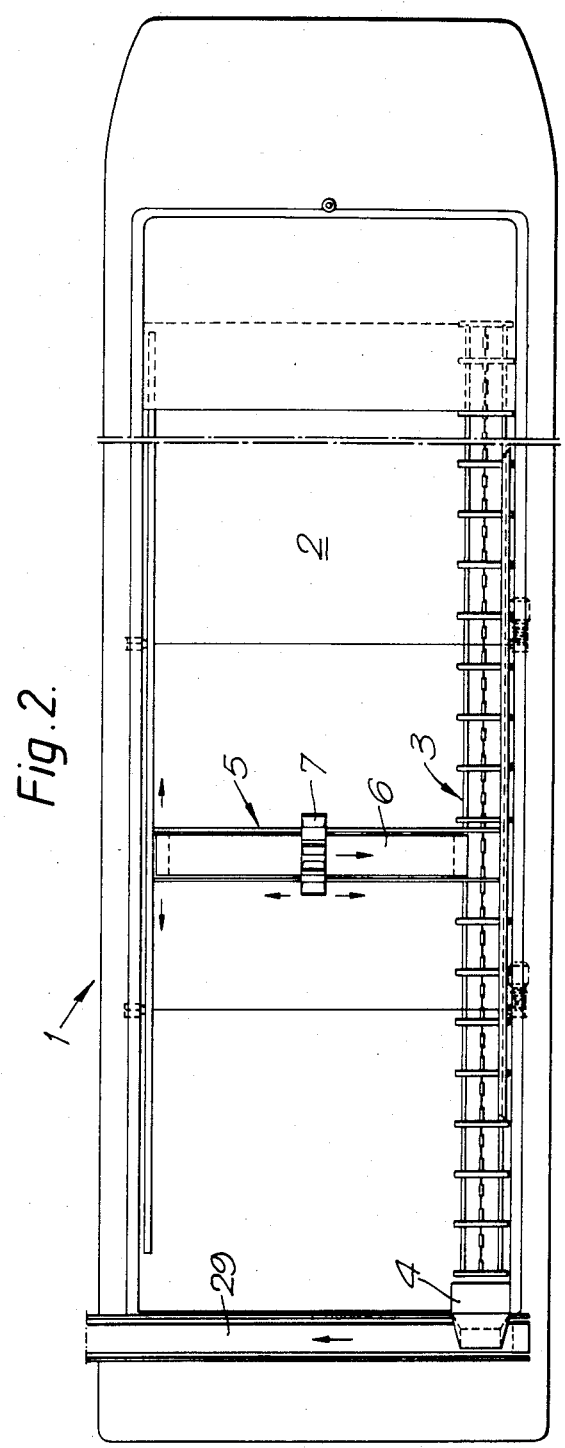
Fig. 1.
Fig. 2.

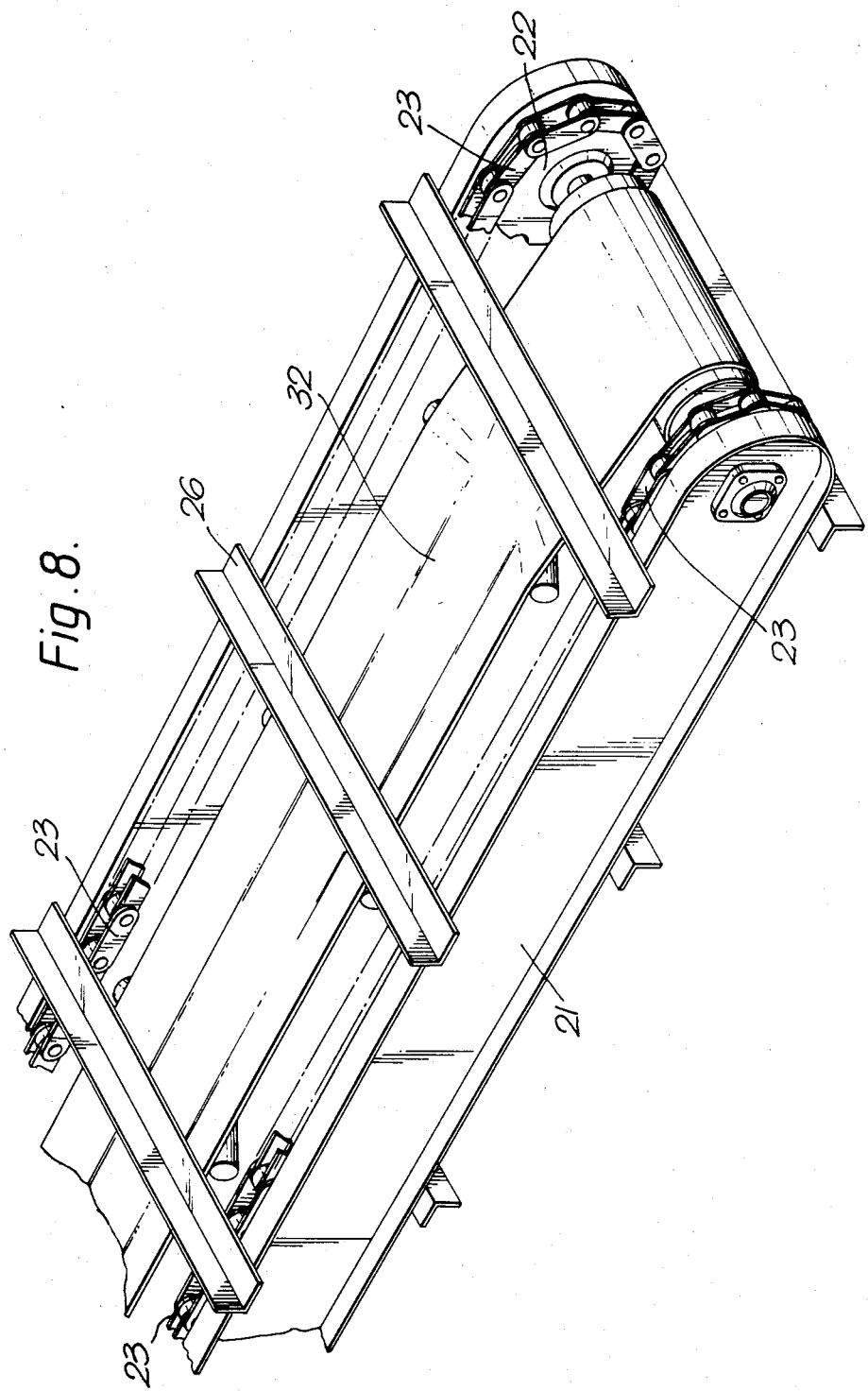

EMPTYING DEVICE FOR BULK MATERIAL

The present invention relates to an emptying device for bulk material in cargo or storage rooms, comprising a first horizontal conveyor which is arranged to be raised and lowered along one of the sides of the room and is arranged to move the bulk material in the direction of a lifting conveyor, and a further horizontal conveyor which is arranged to transport the bulk material towards said first horizontal conveyor and is movable along the latter.

An emptying device of this type is previously known from NO-PS No. 138 442. Here, the horizontal conveyors consist of raking means which are vertically movable independently of each other so that they may be adjusted for the most advantageous slide angle, dependent upon the type of bulk material to be handled. An embodiment of this previously known invention is shown in Norwegian publication No. 147 376. Here, the two rake means are coupled together so that they may be moved vertically more or less as a unit. However, also in this case one is dependent upon a certain mutual vertical adjustability in order for the system to function for various types of bulk material.

These previously known rake means, also called scrape conveyors, attack the bulk material on the surface and carry it along. The accompanying strain on the material may result in that the grain size for certain types of material is reduced, which is considered detrimental in certain uses. Furthermore, it is found that scrape conveyors have certain capacity limitations.

The present invention aims at alleviating the above deficiencies and concurrently providing an emptying device having large capacity and a wide utility range as regards types of bulk material.

According to the invention this is obtained in an emptying device of the type mentioned by way of introduction, characterized in that said first horizontal conveyor is provided with means for digging room for itself in the bulk material as it is lowered, and that the second horizontal conveyor comprises a belt conveyor and an excavating wheel rotatable about the conveyor.

By providing said first horizontal conveyor with digging means one is much more free in choosing the type of conveyor to be used, with respect to both the capacity of the conveyor and sparing of the bulk material. The second horizontal conveyor is of a type which has high capacity and which treats the bulk material relatively gently.

A horizontal conveyor of the last mentioned type is known per se, for instance from DE-OS No. 2 311 900. In this known device the belt conveyor is mounted in the cargo room in a ship and extends transversely of the ship. The belt conveyor is supported in crabs which can move in the longitudinal direction of the ship and is at one end provided with a vertical conveyor which is meant to follow the belt conveyor and its excavating wheel when it moves in the longitudinal direction of the ship. However, it is difficult to see how this known device can function. When the cargo room is full of bulk material, the vertical conveyor will be blocked by the material. Furthermore, the excavating wheel may only be moved between the supporting points in the crabs, the result being that it cannot cover the entire width of the cargo room and therefore not dig a path for the belt conveyor or the vertical conveyor. It may be seen that the present invention does not have these decisive drawbacks.

According to an advantageous embodiment of the present invention, said first horizontal conveyor comprises a longitudinal chute in which movable catchers are arranged, said digging means being constituted by scrapers which are movable on the bottom side of the chute. Thereby a conveyor is obtained which is both simple and sturdy, but which concurrently can convey large quantities of bulk material in a relatively gentle manner.

The above catchers and scrapers may each be attached to a chain. According to a further advantageous feature of the invention, however, the catchers and scrapers are attached to a common endless chain, the chain or attachment means thereof running in a slot in the bottom of the chute.

In order for the scrapers on the bottom side of said first conveyor to subject the bulk material to the least possible strain, the two horizontal conveyors should during normal operating conditions be arranged with respect to each other so that the bottom edge of the excavating wheel of the belt conveyor lies somewhat lower than the scrapers of the first conveyor. Thereby the bulk material will slide naturally down towards the excavating wheel without the scrapers having to perform much work at all. When the excavating wheel reaches the bottom of the room, however, there will still be a small amount of bulk material under the first conveyor. In order that also this material may be removed, the two horizontal conveyors are, according to the invention, vertically movable with respect to each other to a limited degree, whereby the first conveyor may be lowered to contact with the bottom of the room and thus remove the last remnant of bulk material by means of its digging means.

For better understanding of the invention it will be described more closely with reference to the exemplifying embodiments shown in the appended drawings.

FIG. 1 shows in side view a section through a barge provided with an emptying device according to the invention.

FIG. 2 shows the barge in FIG. 1 viewed from above.

FIG. 7 shows perspectively a detail of an emptying device according to the invention, while FIG. 8 shows a modification thereof.

Figure 3:
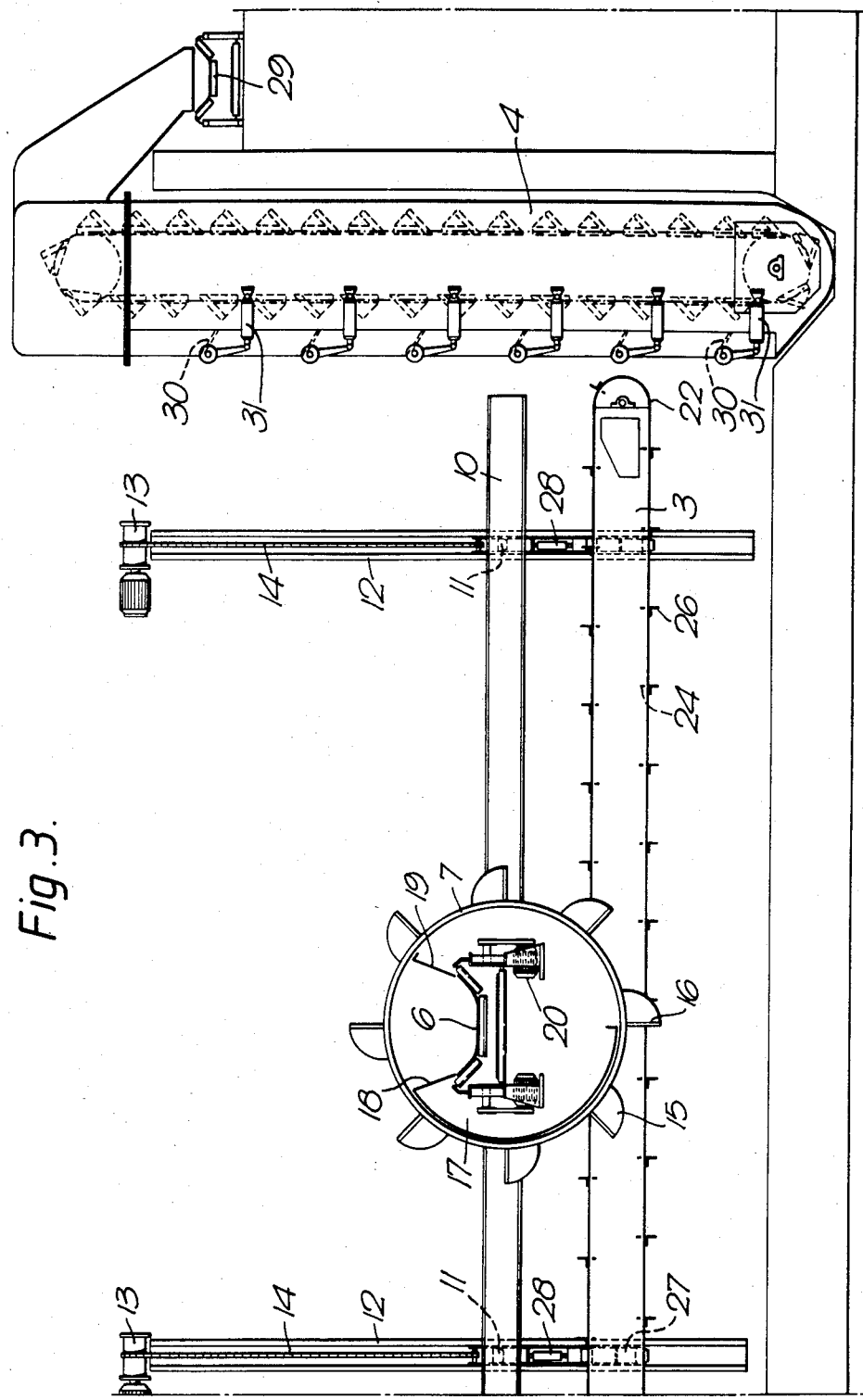
FIG. 3 shows at a larger scale a partial section in accordance with FIG. 1.

The barge 1 shown in FIGS. 1 and 2 has a cargo room wherein an emptying device according to the invention is arranged. This device comprises a first horizontal conveyor 3, which is arranged to be raised and lowered along one of the two sides of the cargo room and is arranged to move the bulk material in the direction of a lifting conveyor 4 arranged in one corner of the cargo room. A second horizontal conveyor, generally designated 5, extends transversely of said first conveyor and is movable along the latter in the longitudinal direction of the cargo room and together with the latter in the vertical direction. This second horizontal conveyor comprises a belt conveyor 6 and an excavating wheel 7 which is movable back and forth along the belt conveyor.

Figure 4:
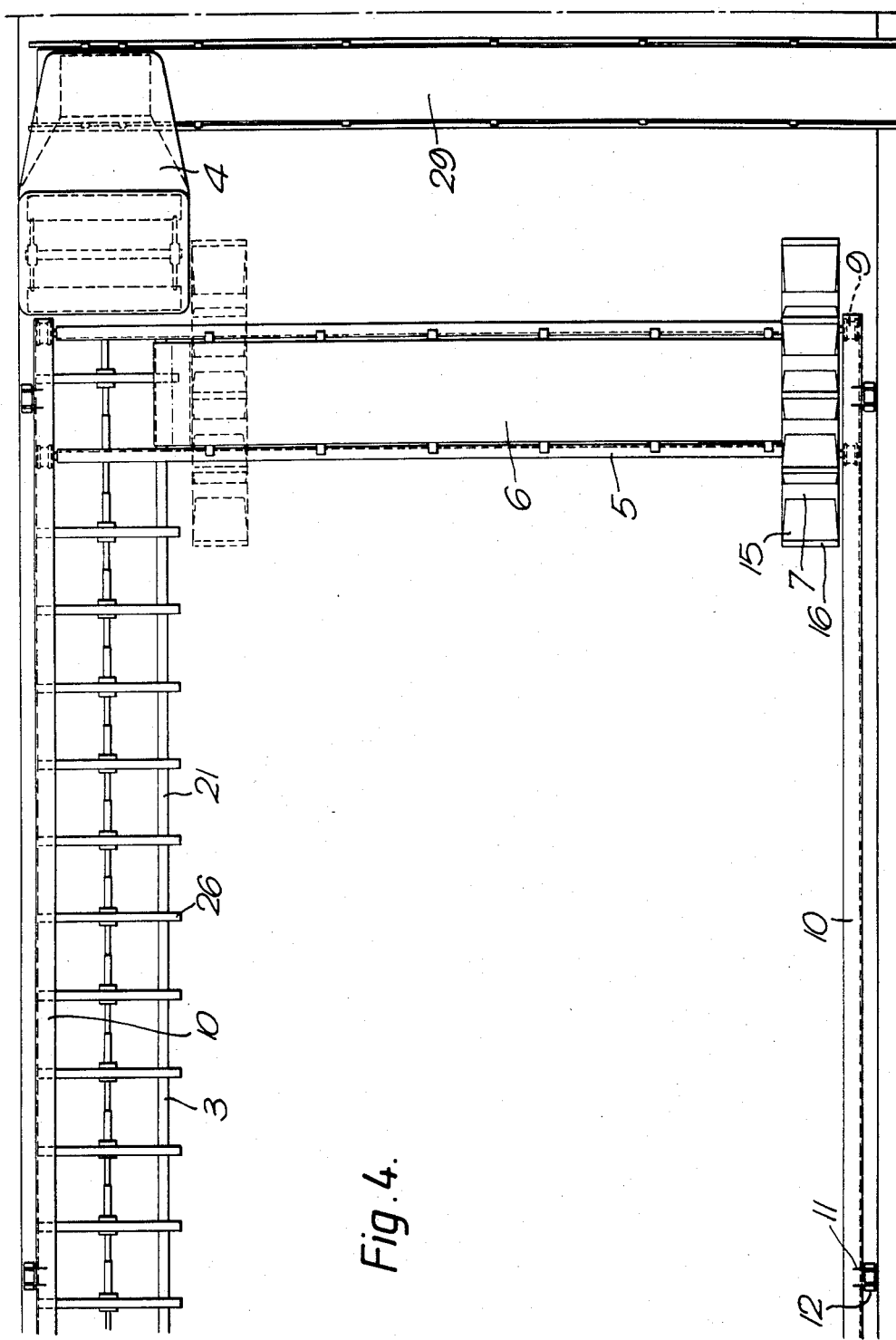
FIG. 4 shows the device in FIG. 3 viewed from above.
Figure 5:
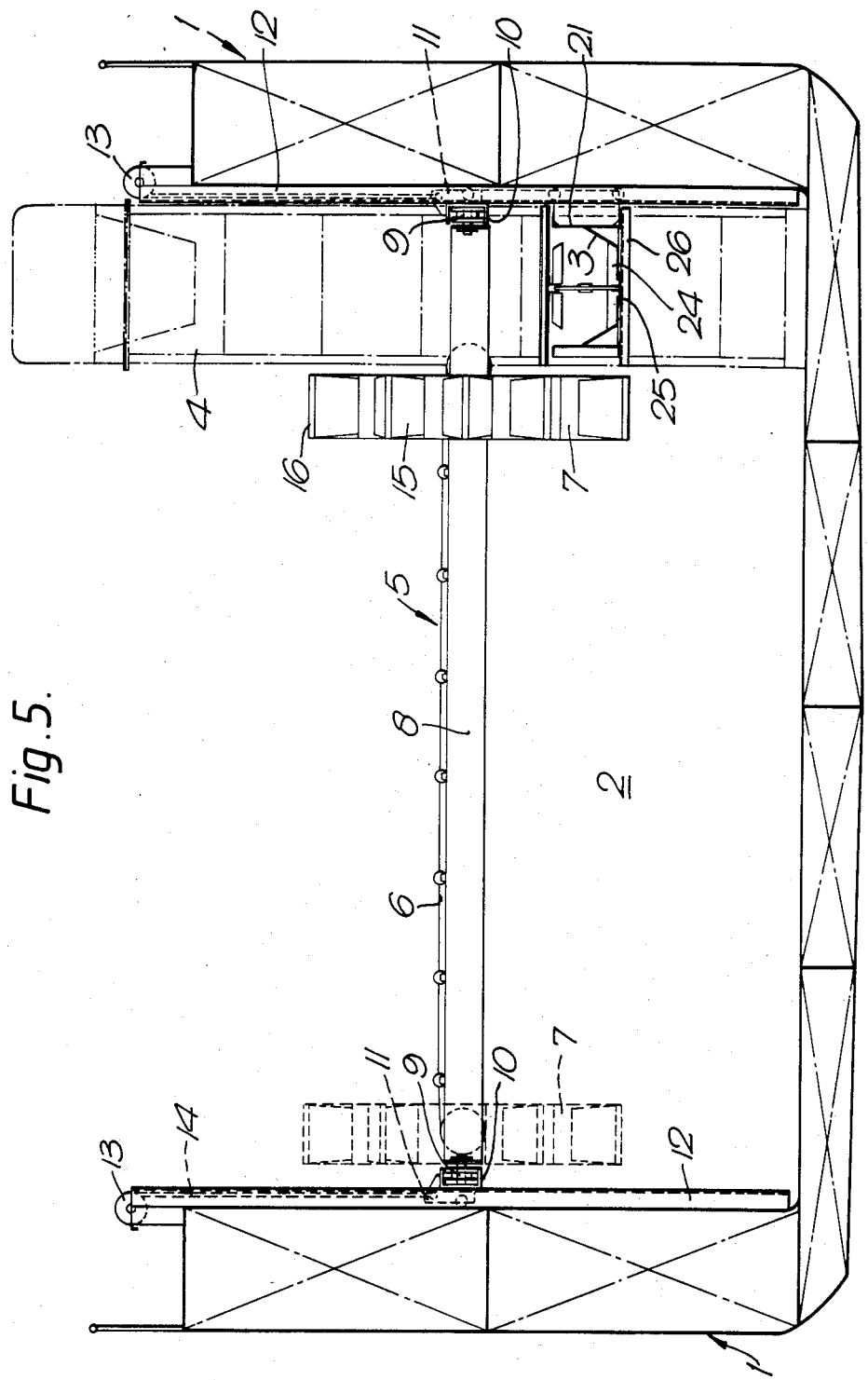
FIG. 5 shows a cross-section through a vessel provided with a device according to the invention.

FIGS. 3–5 show further details of said second horizontal conveyor. Similar or corresponding parts are given the same reference numerals, even though some details in the embodiments are different.

The second horizontal conveyor comprises a frame or beam 8, which at both ends is provided with carrier wheels 9. These run in horizontal guides 10, which in turn are provided with roller pieces 11 running in vertical guides 12. The roller pieces 11, and consequently also the horizontal guides 10 and the belt conveyor 5, may be raised and lowered by means of winches 13 and corresponding tension means 14. The details of the excavating wheel 7 are best shown in FIG. 3. The wheel is provided with excavating buckets 15 which open forwardly in the direction of motion and which, furthermore, are open inwardly towards the center of the wheel. The excavating buckets are provided with a reinforced forward edge 16. Along a section of the inside of the wheel a curved plate 17 extends and forms the rear wall for the excavating buckets until these have reached the emptying section limited by deflectors 18, 19. The deflectors form a chute down towards the belt conveyor 6.

The excavating wheel is of course provided with means (not shown) for causing it to rotate and, furthermore, it has means for moving it along the belt conveyor 5, represented by motors 20. Alternatively, the excavating wheel may be so broad that it extends substantially in the entire length of the belt conveyor, so that longitudinal movability becomes unnecessary. It is also possible to provide several excavating wheels on each belt conveyor.

The device according to the invention comprises of course also drive means for the belt conveyor 6 and means for moving the latter along the horizontal guides 10. For the skilled person it will be clear how these may be arranged.

Figure 6:
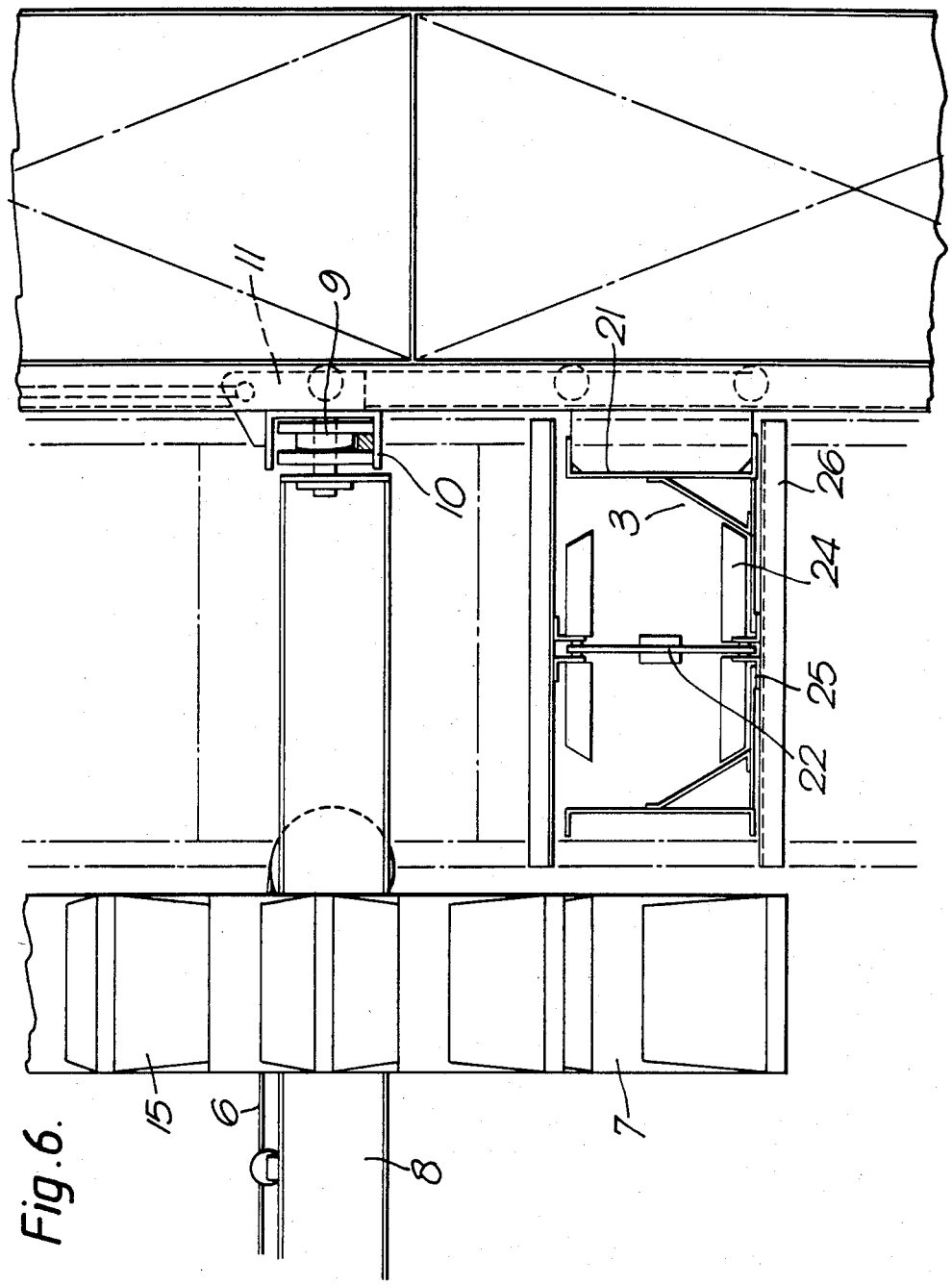
FIG. 6 shows part of FIG. 5 at a larger scale.
Figure 7:
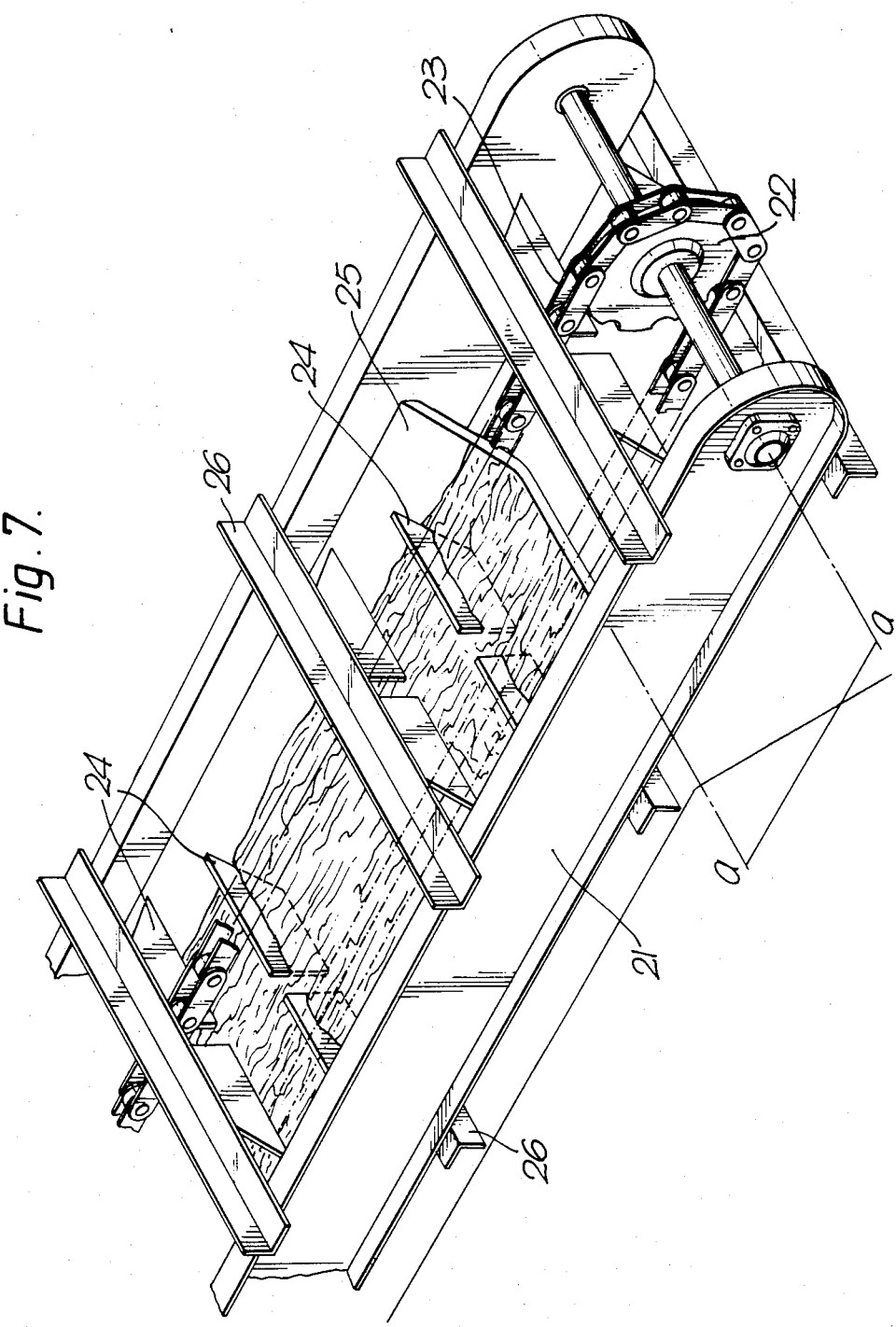

Further details of the first horizontal conveyor 3 will appear more closely from FIGS. 6 and 7. It will be seen that the conveyor comprises an elongate framework having side members 21, the ends of the framework being provided with a guide sprocket wheel 22 for an endless chain 23. Catchers are fixed to the inside of the chain, the catchers having a contour adapted to the profile of a chute 25 arranged between the side members 21 of the framework. This chute has a slot in the bottom for the chain 23 or fixing brackets on the chain for the catchers. The catchers are divided to be able to pass the guide sprocket wheel 22.

Oppositely of the catchers, on the outside of the chain 23, scrapers 26 in the form of angle irons are arranged. These are so long that they extend somewhat beyond the side members 21 of the frame and may rest against flanges on these. In addition to digging bulk material away on the bottom side of the conveyor, the scrapers 26 contribute in stabilizing the catchers 24 and preventing these from tilting and jamming when they push the bulk material in the chute 25.

As indicated in FIG. 7, the chute 25 extends in almost the entire length of the conveyor 3, except from a section a—a at the delivery end. Here, the bulk material will slide from the edge of the chute down towards the lifting conveyor 4 at its natural slide angle, or it is scraped forward to the lifting conveyor by the scrapers 26.

As it appears best from FIGS. 3 and 6, the horizontal conveyor 3 is also provided with roller pieces 27 which run in the same vertical guides 12 as the roller pieces 11 for the horizontal guide 10. The roller pieces 11 and 27 in each guide are attached to each other by means of an adjustable distance member 28, for instance in the form of a hydraulic cylinder or a screw arrangement. By means of the adjustable distance members the conveyor 3 may be raised and lowered within certain limits with respect to the horizontal guide 10 and thus also the belt conveyor 5 with the excavating wheel 7.

The emptying device according to the invention functions as follows:

When the room 2 is to be emptied, the device according to the invention will be situated above the cargo with the belt conveyor 6 and the excavating wheel 7 at one end of the room. First the lifting conveyor 4 and its corresponding conveyor 29 are started. The lifting conveyor is provided with hatches 30 which may be opened by means of cylinders 31 as the level of the cargo sinks. Thereupon the first horizontal conveyor 3, the belt conveyor 5 and the excavating wheel 7 are started. Besides, the excavating wheel moves laterally from one end of the belt conveyor to the other. Next time around the belt conveyor with the excavating wheel 7 is moved a suitable distance along the guides 10, and the excavating wheel passes once more from one side to the other. This is repeated until the entire length of the room is covered. Then the winches 13 are used to lower the entire unit consisting of the two horizontal conveyors and the excavating wheel. Concurrently the first conveyor 3 will dig away bulk material by means of the scrapers 26 to make room for itself, whereupon the belt conveyor with the excavating wheel is run as mentioned above until the entire room is covered.

During the main part of the emptying operation, the distance members 28 may advantageously be adjusted so that the lowermost point on the excavating wheel will be situated some distance below the first horizontal conveyor 3. This means that the bulk material can slide down towards the excavating wheel from the bottom side of the conveyor 3, so that the scrapers 26 do not have to perform much work at all in order to make room for the conveyor. When the emptying is almost finished, i.e. when the excavating wheel has reached the bottom of the room, there will only be some bulk material left on the bottom side of the horizontal conveyor 3. This conveyor may then gradually be lowered by means of the distance members 28 in order for the scrapers 26 to move the remaining bulk material towards the lifting conveyor 4 and thereby emptying the room almost entirely. At the end the horizontal conveyor 3 and the excavating wheel 7 will have the same relative position as shown in the drawings.

It will be understood that the invention may be varied in various ways within the scope of the following claims. Thus, more than one set of conveyors may be arranged in the storage room if indicated by the necessary capacity. Furthermore, the first horizontal conveyor may be modified or replaced by other types. Starting out from the embodiment shown in the drawings, this conveyor may be provided with two separate chains, one external chain for the scrapers and one internal chain for the catchers.

If these have separate drives, the scrapers may only be used when it is necessary to lower the conveyor, while for the rest of the time it may rest on the subjacent bulk material and not strain its supporting system to the same extent. The framework of the conveyor can thereby be made lighter and less expensive. A separate internal chain for the catchers would provide for fixation of the catchers on the outside of the chain, so that the catchers would not have to be divided in order to pass the chain sprocket wheel. Stabilizing of the chain and the catchers could be obtained by suitable guides. Furthermore, it will be understood that the chains could be replaced by other types of tension means, such as wire.

It will also be understood that the catcher conveyor may be replaced by another type of conveyor, for instance a belt conveyor 32 as shown in FIG. 8. This conveyor would additionally have to be provided with suitable digging means 26 having separate drive, for instance of the same type as shown in the other drawings.

Furthermore, for the catcher conveyor a chain slat belt may be used, i.e. where the material rests on slats attached to chains on both sides. This modification will be particularly suited for abrasive material.

I claim:

1. An emptying device for bulk material in cargo or storage room, comprising:
 a first horizontal conveyor;
 means for raising and lowering said first conveyor along a side of the room, said first conveyor being adapted to move said bulk material in the direction of a lifting conveyor;
 a second horizontal conveyor adapted to transport bulk material on the top side thereof towards said first horizontal conveyor, said second conveyor being movable along the latter;
 said first horizontal conveyor including means for digging room for said first conveyor in the bulk material as it is lowered; and
 said second horizontal conveyor comprising a belt conveyor and at least one excavating wheel rotatable about said belt,
 wherein said first horizontal conveyor comprises a longitudinal chute having movable catchers, and wherein said digging means comprieses scrapers which are movable along the bottom side of the chute.

2. An emptying device according to claim 1, wherein the catchers and the scrapers are attached to a common endless chain, and means for attaching said catchers and scrapers runs in a slot in the bottom of said chute.

3. An emptying device according to claim 2, wherein the two horizontal conveyors are independently vertically adjustable, with the bottom edge of the excavating wheel in its relatively highest position being on a level with the digging means.

4. An emptying device for bulk material in cargo or storage room, comprising;
 a first horizontal conveyor including a longitudinal chute having movable catchers;
 means for raising and lowering said first conveyor along a side of the room, said first conveyor being adapted to move said bulk material in the direction of a lifting conveyor;
 a second horizontal conveyor adapted to transport bulk material on the top side thereof towards said first horizontal conveyor, said second conveyor being movable along the latter;
 said first horizontal conveyor including means for digging room for said first conveyor in the bulk material as it is lowered, said digging means comprising scrapers which are movable along the bottom side of the chute; and
 said second horizontal conveyor comprising a belt conveyor and at least one excavating wheel rotatable about said belt conveyor.

5. An emptying device according to claim 4, wherein the catchers and the scrapers are attached to a common endless chain, and means for attaching said catchers and scrapers run in a slot in the bottom of said chute.

6. An emptying device according to claim 5, wherein the two horizontal conveyors are independently vertically adjustable, with the bottom edge of the excavating wheel in its relatively highest position being on a level with the digging means.

* * * * *